Sept. 29, 1936.  J. C. GLAUM, JR., ET AL  2,055,527
GAS CUTTING MACHINE
Filed Aug. 6, 1934  3 Sheets-Sheet 2
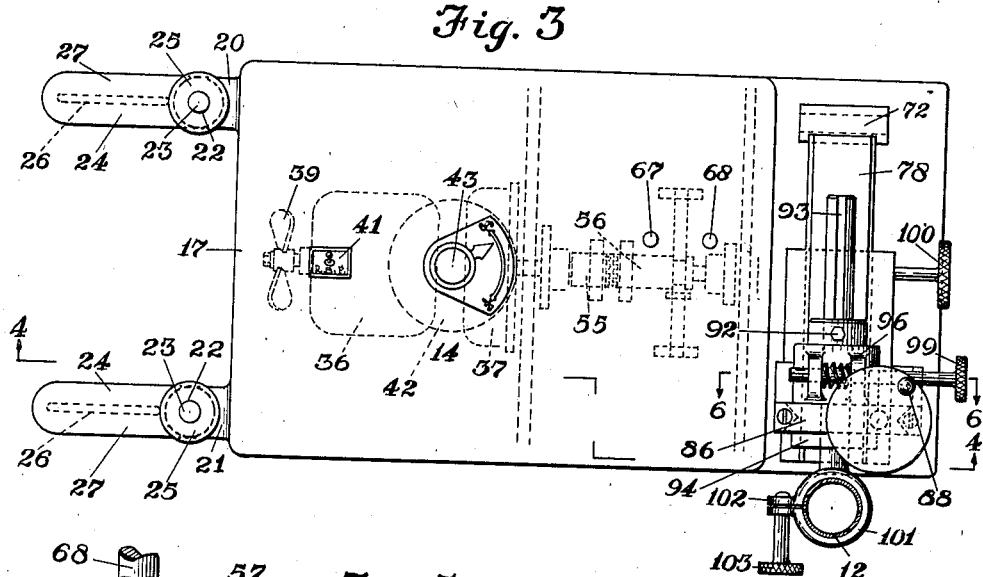
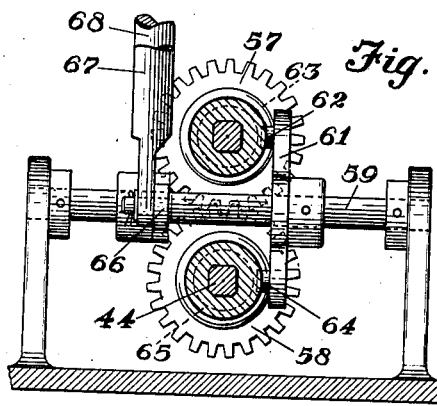
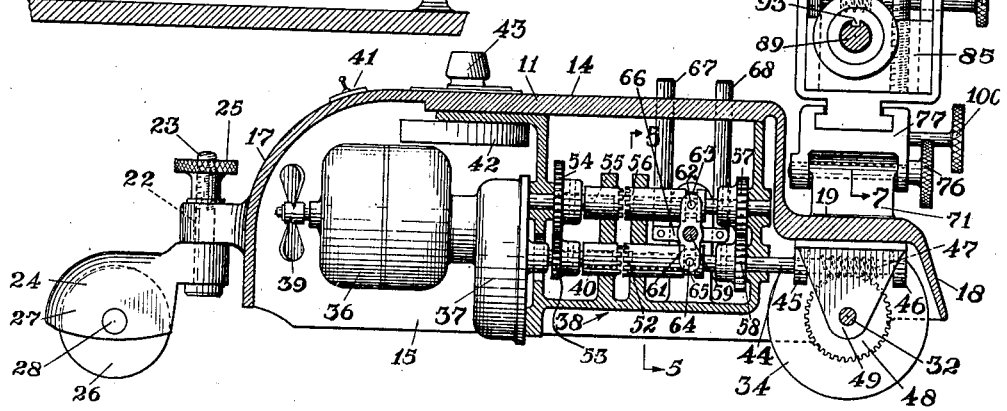
Inventors
John C. Glaum, Jr.
Fred Stoneberg
By: Gillson, Mann & Cox
Attys.

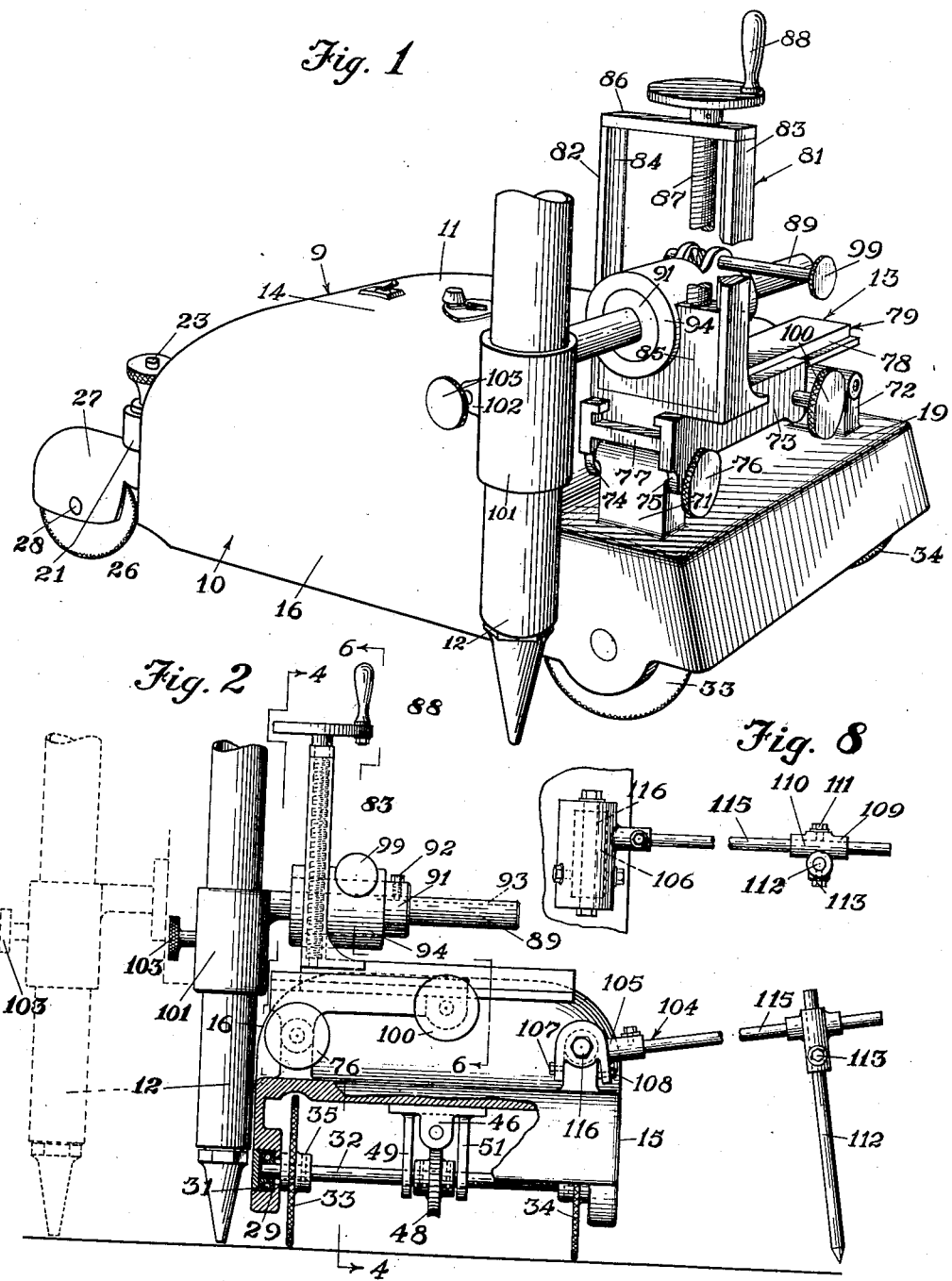

Sept. 29, 1936.  J. C. GLAUM, JR., ET AL  2,055,527
GAS CUTTING MACHINE
Filed Aug. 6, 1934   3 Sheets-Sheet 3

Inventors
John C. Glaum, Jr.
Fred Stoneberg
By: Gillson, Mann & Co.
Attys.

Patented Sept. 29, 1936

2,055,527

UNITED STATES PATENT OFFICE 2,055,527

GAS CUTTING MACHINE

John C. Glaum, Jr., and Fred Stoneberg, Chicago, Ill.

Application August 6, 1934, Serial No. 738,616

13 Claims. (Cl. 266—23)

This invention relates to gas cutting mechanism, and more particularly to the type that is automatically moved along during the cutting operation.

One of the objects of the invention is the provision of a new and improved gas cutting apparatus that is provided with novel means for angularly adjusting the position of the torch for cutting plates at an angle.

Another object of the invention is the provision of a gas cutting apparatus having new and improved mechanism for universally adjusting the torch.

A still further object of the invention is the provision of a new and improved change speed mechanism and transmission for operating a gas cutting carriage.

Another object of the invention is the provision of new and improved means for adjusting and controlling the speed of the carriage during the cutting operation.

A further object of the invention is the provision of a new and improved carriage for gas cutting apparatus.

Another object of the invention is the provision of a new and improved gas cutting apparatus that is simple in construction, efficient in operation, inexpensive to manufacture, readily assembled and easily adjusted and manipulated, and which is not likely to become broken or get out-of-repair.

Other and further objects and advantages of the invention will appear from the following description, taken in connection with the accompanying drawings, in which—

Fig. 1 is a perspective view of the apparatus;

Fig. 2 is a front elevation with parts in section;

Fig. 3 is a plan view;

Fig. 4 is a section on the broken line 4—4 of Fig. 3, and also on the line 4—4 of Fig. 2;

Fig. 5 is a section on the line 5—5 of Fig. 4;

Fig. 8 is a part plan showing radius arm.

Figure 6:
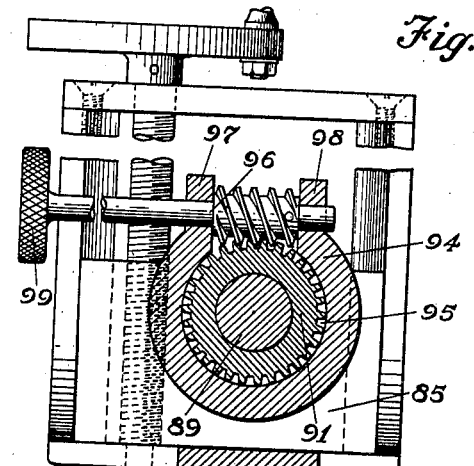
Fig. 6 is a section on the line 6—6 of Fig. 2.

Referring now to the drawings, the reference character 9 designates the carriage which comprises a body portion 11, a torch 12 and torch adjusting mechanism 13. The body 11 may be of any suitable construction. In the form selected to illustrate one embodiment of the invention, which is for the purpose of illustration only, the body portion comprises a hollow casing 10 opening downwardly and having a top wall 14, side walls 15 and 16, a rear wall 17 and a stepped front wall 18 having the horizontal portion 19. The casing 10 constitutes the framework of the apparatus, thus simplifying and greatly reducing the cost of manufacture and the weight of the same, as this casing may be cast in one piece of aluminum alloy.

The body 11 is provided with wheels for transporting the same. As shown, the rear wall 17 is provided with rearwardly extending lugs 20 and 21 having vertical openings 22 therethrough for the reception of shanks 23 of casters 24. The shank 23 of each caster is rigidly connected with said caster and is screw threaded on its outer or upper end for receiving the binding nut 25. When the binding nut 25 is loosened, the shank 23 is free to turn in the opening 22 to permit swivel movement of the caster 24, as is usual in such constructions. By tightening the binding nuts, the casters may be locked in any desired angular adjustment.

The casters 24 may be of any suitable construction. As shown, each caster comprises a wheel 26 and a support 27 which projects downwardly on each side of the wheel through which a pivot 28 extends for constituting an axle for the wheel 26.

The body at its front end has its side walls provided with bosses having recesses 29 (see Fig. 2) in which are mounted ball bearings 31 for the front axle 32. This axle is provided with the wheels 33 and 34 adjacent to the side walls of the car but inwardly thereof. The wheels 33 and 34 are rigidly secured to the shaft 32 in any conventional manner as by means of pins 35.

Suitable means are provided for propelling the carriage. This means comprises a variable speed motor 36, a transmission 37 in the form of a speed reducing mechanism and a change speed gear mechanism 38 mounted within the hollow casing or body 11. The motor is provided with a suitable fan 39 for cooling the same. The top wall 14 of the casing is provided with a switch 41 movable to three positions for stopping, starting and reversing the motor. The speed of the motor is controlled by a conventional rheostat 42, the knob 43 of which extends above the top wall 14 and is arranged adjacent to the switch 41.

Appropriate change speed mechanism 38 is provided for operating the carriage from the motor 36. This mechanism comprises a drive shaft 44 journaled at its forward end in the downwardly extending lugs 45 and 46 which are rigidly secured to the stepped front wall 18.

This shaft is provided with a worm 47 which engages a worm gear 48 rigidly secured to the axle 32 (see Figs. 2 and 4). The axle 32 is supported at opposite sides of the worm gear 48 by hanger arms 49 and 51 (see Fig. 2), which depend from, and are rigidly connected to, the horizontal portion 19 of the front wall, as shown in Fig. 4 of the drawings. The drive shaft 44 is in two parts adapted to be connected by a clutch 52. The rear section 40 of the shaft 44 is driven from the motor 36 through a reduced gearing constituting the transmission 37. The section 40 of the shaft 44 is provided with a pinion 53 which meshes with a gear 54 on a counter shaft 55. The shaft 55 is also in two parts connected together by a clutch 56. The forward portion of the shaft 55 is provided with a gear 57 which meshes with a gear 58 on the forward portion of the drive shaft 44. Gears 57 and 58 have the same number of teeth while the pinion 53 has a less number of teeth than the gear 54, thereby providing a two-speed drive through this mechanism.

The clutch operating mechanism comprises a transverse shaft 59 on which is mounted an arm 61, one end of which is provided with clutch pins 62 engaging in a groove 63 on the sliding clutch sleeve of the clutch 56 for operating the same. The other end of the arm is provided with clutch pins 64 which engage in a groove 65 in the sliding clutch sleeve of the clutch 52 for operating the clutch on the shaft 55. A cross arm 66 is provided on the shaft 59 and has attached to one of its ends a push button 67 and attached to its other end a push button 68. The push buttons 67 and 68 extend upwardly through the top wall 14 of the body whereby access may be readily had to the same. In the operation of the device, assuming that the parts are in the position shown in Fig. 4, when it is desired to operate the carriage directly from the motor through the transmission and the power shaft 44, the button 68 is pressed downward which will rock the arm 61 for interengaging the clutch member 52. When it is desired to operate the carriage at a slower rate of speed by the change speed mechanism, the button 67 is depressed which will disengage the clutch 52 and engage the clutch 56. The drive will then be from the motor through the transmission or gear reduction mechanism 37 through the pinion 53, gear 54 and gears 57 and 58 for operating the shaft 44 at a lower rate of speed. For finer adjustments of speed, the rheostat 43 is operated for controlling the speed of the motor 36. When the buttons 67 and 68 are in the position shown in Fig. 4, the motor is disengaged from the carriage driving mechanism and the carriage may then be moved to any desired position by hand.

Suitable means are provided for supporting and for adjusting the torch 12. In the form of construction shown, the horizontal part 19 of the stepped front wall 18 is provided with a pair of upstanding projections 71 and 72 (see Figs. 1 and 4). Each of these lugs is provided with a horizontal opening adjacent its upper end. A base member 73 has downwardly extending lugs 74 and 75 which are provided with apertures through which an adjusting or clamping screw 76 extends for connecting the base member 73 to either of the lugs 71 or 72, as desired. The aperture through the lug 74 is screw threaded whereby by manipulating the screw 76, the lugs 74 and 75 may be clamped against the sides of the upstanding projection to which the base member is attached for holding said member in any desired angular position in a vertical plane to which it may be turned for varying the angle of the torch, as will presently appear. The base member 73 is provided with a guideway 77 in which is slidably mounted the horizontal arm 78 of an L-shaped support 79.

The standard 81 constituting the vertical portion of the L-shaped support comprises two uprights 82 and 83 spaced apart for providing a guideway 84 along which an adjusting block 85 is vertically slidable. A cross member 86 connects the upper ends of the uprights 82 and 83 and an adjusting screw 87 extends downward through the cross member 86 and engages internal threads in the block 85 for raising and lowering said block when the screw is rotated. The upper end of the screw is provided with a crank or handle 88 for rotating the screw.

Figure 7:
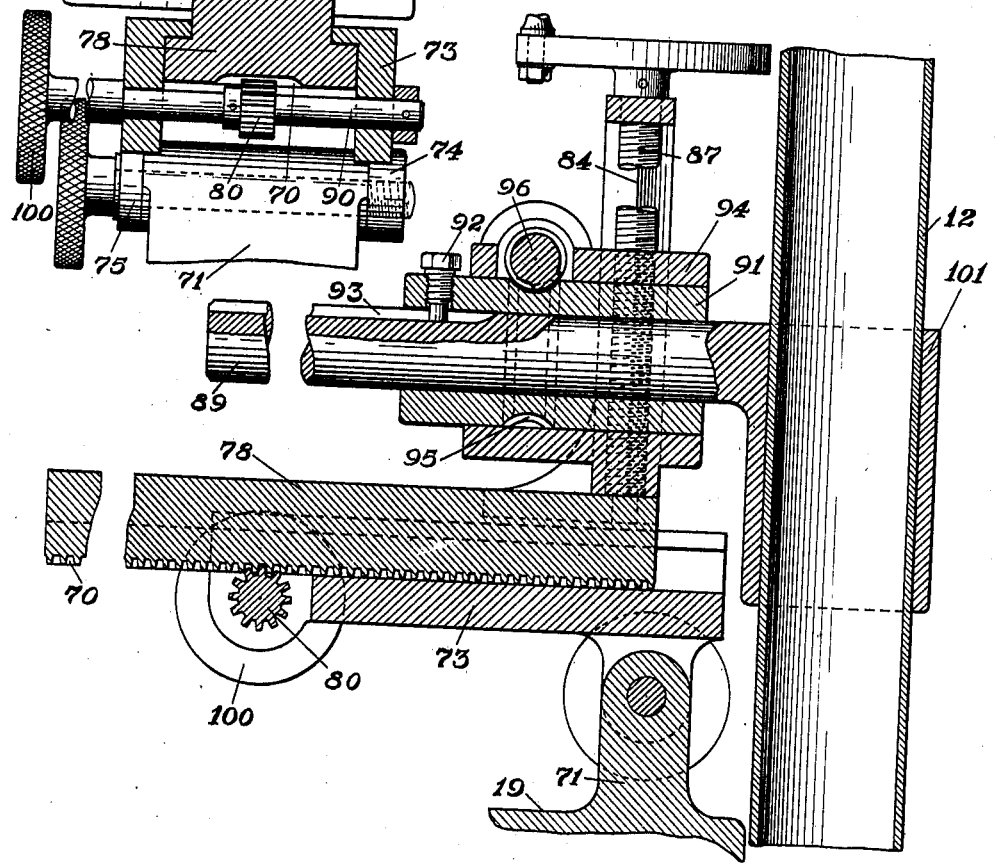
Fig. 7 is a section on the line 7—7 of Fig. 4.

Suitable means are provided for adjusting the support 79 along the base 73. As shown, the horizontal arm 78 is provided on its under side with a rack 70 (see Figs. 6 and 7) which is engaged by a pinion 80 on a shaft 90 journaled in the side walls of the base member 73.

An operating knob 100 is provided on one end of the shaft 90 for rotating the same for adjusting the support 79 transversely to the carriage.

A torch supporting arm 89 is carried by the adjusting block 85. Suitable means are provided for rotating the arm 89 and holding the same in adjusted position. As shown, the arm is mounted in an inner sleeve 91 and is adjustable longitudinally therein. The inner end of the sleeve is provided with a set screw 92, the reduced end portion of which engages in a groove 93 extending longitudinally of said arm for preventing rotation of the arm in the inner sleeve and for holding the same in adjusted position. The inner sleeve 91 is rotatably mounted in an outer sleeve 94 rigidly secured to the block 85. The inner sleeve 91 is provided with an annular rack 95 (see Fig. 6) which is adapted to be engaged by a worm 96 carried by lugs 97 and 98 on the sleeve 94. The worm shaft is provided at its outer end with a knurled knob 99 for rotating the worm. The outer end of the arm 89 is provided with a split sleeve 101 in which is slidably mounted the torch 12. The ends of the split sleeve have apertured extensions 102 through which the clamping screw 103 extends. The inner extension 102 is threaded whereby on turning of the screw 103 the sleeve may be clamped about the torch 12.

When it is desired to elevate the torch 12, the screw 87 is rotated by the handle 88 or the screw 103 may be loosened and the torch elevated by hand.

The torch 12 may be adjusted angularly in a vertical plane longitudinally of the vehicle by rotating the knob 99 of the worm shaft 96. To adjust the torch angularly transversely to the carriage for bevel cutting, the clamping screw 76 is loosened and the base 73 is elevated or depressed to a position for cutting the plate at the required angle to give it the desired bevel. The torch may be adjusted to and from the carriage by rotating the knob 100 which will cause the support 78 to move along the base 73. The torch may also be adjusted transversely to the carriage by loosening the set screw 92 (see Fig. 2) and sliding the arm 89 through the inner sleeve 91.

Means are provided for making circular cuts with the apparatus. Any suitable means may be employed for this purpose. As shown, a radius member 104 comprising a head 105 and an arm 115 is employed for this purpose. The head 105 is provided with a socket 106 which is adapted to receive one or the other of the duplicate lugs 71 or 72. The side walls of the socket have aligned apertures for receiving a pin 116 for pivotally connecting the head to the lug. The head is provided with the set screws 107 and 108 for angularly adjusting the radius member about the pivot 116 for raising the wheel 34. The inner end of the arm 115 is threaded into the head and its outer end is provided with an adjusting and holding block 109. The block has an aperture 110 therethrough for slidingly receiving the arm 115. The block is held in adjusted position along the arm by a set screw 111. The block 109 also has a vertical aperture for slidably receiving the centering arm 112. The arm is held in adjusted position by a set screw 113.

In the operation of the device, when it is desired to make a curved or circular cut, an indentation is made in the plate at the center of the proposed curved and the radius member 104 is attached to the lug 72 and the parts adjusted to the proper radius, the centering arm is adjusted so that the point 114 engages in the indentation, after which the set screw 107 is operated to swing the radius member downward which will raise the inner wheel and caster. The outer caster is then released to enable it to swivel and the device is ready for operation.

The parts are preferably, though not necessarily, so constructed that by offsetting the radius member 104 the centering arm 112 and the torch will be in the vertical plane of the front axle 32 so that the axle, torch arm and member 104 will constitute the radius of the curve in cutting the metal. If circular cuts of shorter radii are desired, the support 79 may be removed from the base 73, turned end for end and replaced with the torch on the same side of the carriage as the radius member. By adjusting the block 109 along the arm 115, or by adjusting the support 79, or the arm 89, or any or all of them, the curve of the desired radius may be cut.

We claim as our invention:—

1. In a gas cutting apparatus, a carriage, torch supporting means on said carriage, said means including an upright standard, a torch supporting arm slidably mounted on said standard, a torch carried by said arm, means for elevating said arm on said standard, and means mounted directly on the standard for rotating said arm relative to said standard.

2. In a gas cutting apparatus, a carriage, means for operating the same at a selected speed, a torch, means including a standard for supporting said torch from said carriage, mechanism on said standard for adjusting said torch angularly in a vertical plane longitudinally of said carriage, means for operating said mechanism, means for raising and lowering said mechanism on said standard, and means for angularly adjusting said torch in a plane transversely to said carriage.

3. In a gas cutting apparatus, a carriage, a standard for supporting a gas torch, means on said carriage for adjusting said standard angularly in a vertical plane transversely to said carriage, means for adjusting said torch to and from said carriage, and means for raising and lowering said torch on said standard.

4. In a gas cutting apparatus, a carriage, an upright standard, means for pivotally connecting said standard to said carriage to pivot about a horizontal axis, a torch carrying arm slidably mounted on said standard, and a torch carried by said arm.

5. In a gas cutting machine, a carriage comprising a hollow casing having integral top, side and end walls, said top wall having a downward offset at its forward end, a pair of wheels within the planes of the side walls of said casing for supporting the front end of said casing, a pair of casters for supporting the rear end thereof, means for securing said casters in angularly adjusted position, a motor within said casing, change speed mechanism housed within the rear portion of said casing for driving said carriage from said motor, a torch, a supporting standard therefor, mounted on said offset, means for adjusting said supporting standard relative to said casing whereby said torch and supporting standard may be moved transversely outwardly from said casing and tilted in a plane transversely to said carriage.

6. In a gas cutting apparatus, a carriage, means for propelling the same, a gas torch, means for adjustably mounting the same on said carriage, said means comprising a post at each side of said carriage, a torch support interchangeably connected to said posts and adjustable in a vertical plane about said posts, a radius member, means for adjustably connecting said member to either of said posts, said support and member being interchangeable, a centering element and means for adjustably supporting said element from said member.

7. In a gas cutting apparatus, a carriage, means for propelling the same, a supporting element at each side of said carriage, a track member adapted to be connected to either of said elements to swing in a vertical plane, a torch support slidably mounted on said track, a torch and means for adjustably mounting said torch on said support, whereby said track may be connected to either of said elements for adjustably supporting said torch at either side of said carriage.

8. In a gas cutting apparatus, a carriage, means for propelling the same, a torch, a supporting slide-way, means including a horizontal post for pivotally mounting said slide-way on said carriage, a torch support slidable along said slide-way, said support being reversible on said slide-way whereby by reversing said support said torch may be supported at either side of said carriage.

9. In a gas cutting apparatus, a carriage, a supporting element rigidly mounted on said carriage, a slide-way pivoted to said element, a support slidable along said slide-way, an arm on said support, means to rotate said arm on said support, means for raising and lowering said arm on said support, means for rotating said arm on said support, a torch and means for adjustably mounting said torch on said arm.

10. In a gas cutting apparatus, a carriage, means for propelling the same, a support mounted on said carriage, a torch supporting arm, means for raising and lowering the same on said support, means for rotating said arm on said support and for slidably supporting the same, a torch and means for adjustably supporting said torch on said arm.

11. In a gas cutting apparatus, a carriage, means for operating the same at a selected speed, a standard rigidly mounted on said carriage, a base member pivoted to said standard to swing about a horizontal axis, an L-shaped support slidably mounted on said base member, means for moving said support along said member, a torch supporting arm movably mounted on said support, means for raising and lowering said arm on said support, a torch, and means for adjustably connecting said torch to said arm.

12. In a gas cutting apparatus, a carriage, means for operating the same at a selected speed, a standard rigidly mounted on said carriage, a base member pivoted to said standard to swing about a horizontal axis, an L-shaped support slidably mounted on said base member, means for moving said support along said member, a torch supporting arm movably mounted on said support, means for raising and lowering said arm on said support, means for rotating said arm on said support, a torch, and means for slidably connecting said torch to said arm.

13. In a gas cutting apparatus, a carriage, means for operating the same at a selected speed, a standard rigidly mounted on said carriage, a base member pivoted to said standard to swing about a horizontal axis, a support adjustable along said base, said support comprising an upstanding member, a torch supporting arm slidably and rotatably mounted on said member, and a torch slidably and rotatably mounted on said arm.

JOHN C. GLAUM, Jr.
FRED STONEBERG.